United States Patent

[11] 3,628,352

[72] Inventor Robert E. Stuemky
 Denver, Colo.
[21] Appl. No. 53,369
[22] Filed July 9, 1970
[45] Patented Dec. 21, 1971
[73] Assignee The Gates Rubber Company
 Denver, Colo.

[54] FLEXIBLE COUPLING
 12 Claims, 9 Drawing Figs.
[52] U.S. Cl. .................................................. 64/15 C,
 64/27 C
[51] Int. Cl. .................................................. F16d 3/52
[50] Field of Search ........................................ 64/2, 15, 15
 C, 27 C

[56] References Cited
 UNITED STATES PATENTS
1,472,782 11/1923 Barber ...................... 64/15
3,347,061 10/1967 Stuemky .................. 64/15

2,536,216 1/1951 Powell ........................ 64/15 X
 FOREIGN PATENTS
 693,844 7/1953 Great Britain ............... 64/15

Primary Examiner—Kenneth W. Sprague
Attorneys—Raymond Fink, H. W. Oberg, Jr. and Curtis H. Castleman, Jr.

ABSTRACT: A flexible coupling member generally of tubular shape and having oppositely wound spiral spring elements disposed within a matrix of rubber material. The coupling member may further include a plurality of textile cords disposed between the spring elements; and a pair of concentric annular sleeves sandwiching and bonded to the rubber matrix at each end of the coupling member. End caps are fitted to each end of the coupling member by either displacing a portion of the coupling member into concavities of the end caps, or by mechanically joining the sleeves of the coupling member to the end caps.

PATENTED DEC 21 1971

INVENTOR.
ROBERT E. STUEMKY
BY H. H. Oberg Jr.
ATTORNEY

INVENTOR.
ROBERT E. STUEMKY
BY H.H. Oberg Jr.
ATTORNEY

FLEXIBLE COUPLING

BACKGROUND OF THE INVENTION

This invention relates to flexible shaft couplings but more particularly, the invention relates to yielding elements of the spring type for flexible couplings and to gripping means that resist slippage between the end cap and spring means under high-torque applications.

Prior art discloses various techniques for utilizing a spring means for transmitting torques between driver and driven members. Problem associated with prior art devices become magnified as the torque-transmitting requirements for the spring means is increased. A major problem associated with the spring means is that of fretting corrosion between circumjacent spring elements. Lubricants are dispersed between the spring elements as a fretting corrosion deterent. Once lubricants have been added, a boot or cover is included to prevent debris from contaminating the lubricant and abrading the spring elements. Boots have a tendency to balloon at high rotational speeds which may lead to failure thereof while demanding need for a larger space envelope. Typically, increased torque-carrying capability requirements dictated use of expensive spring elements. Some devices require the use of special wire having a rectangular cross section to achieve a flat supporting surface between the circumjacent spring elements. Other devices require special matching of the spring elements to achieve concentricity therebetween while maintaining the minimum tolerance. As will be understood by those skilled in the art, placing the spring elements in close proximity to one another invites occurrence of fretting corrosion and failure of the device.

Other prior art devices require use of tapered spring means to prevent a creeping of the helical spring elements, which can lead to failure, annoying "clunk" or vibration sounds.

Still other prior art devices require use of special alloy spring wire of great toughness and high quality. Use of such alloys complicate the means for attaching end caps to the spring means as harmful stress concentrations are readily induced.

SUMMARY OF THE INVENTION

The invention includes at least two oppositely spiralled concentric spring elements disposed within a rubber matrix of generally annular cross section. The rubber matrix substantially separates circumjacent spring elements to limit occurrence of fretting corrosion and eliminates the need for a lubricant. Alternately, textile cords or material are sandwiched between circumjacent spring elements to further separate the spring elements and decrease probability of physical contact therebetween.

The invention is based on the perception that it is not necessary for circumjacent spring elements of opposite spirals to completely engage one another before a transmission of torque takes place. Prior art has taught just the opposite precept. Adding a resilient rubber material between spring elements permits them to be subjected to tension and compression stresses at various torque, but with limited physical contact. The resilient material encompasses or nests each wire of a spring element and lends physical support thereto. The column strength or efficiency of each wire is effectively increased.

End caps are attached to each end of the coupling member to define a flexible coupling. An end cap having a hub and concentric sleeve with serrations therein may be directly crimped to the coupling member. Alternately, concentric sleeves are fabricated in the coupling member. The sleeves sandwich the coupling member at each end thereof. End caps may then be directly attached to the sleeves. In either case, mechanical gripping of the wires is minimum or avoided to preclude inducement of stress concentrations. A centering device mounted between the end caps allows only angular misalignment therebetween.

Accordingly, an object of the invention is to provide a coupling member of the opposite spiral spring type which does not require a lubricant for the springs.

Another object of the invention is to provide a constant velocity coupling of the spring type which has high torque capacity.

Another object of the invention is to provide a spring type coupling member of high torque capacity which does not require use of spiral spring alloys or cross sections.

Yet another object of the invention is to provide a process for gripping a coupling member which does not induce stress concentrations thereto.

Another object of the invention is to limit occurrence of fretting corrosion between spring elements of a coupling member.

Still another object of the invention is to provide a quiet operating coupling member.

Another object of the invention is to eliminate the need for specially tapered spring elements in a coupling member.

And another object of the invention is to provide a coupling member of the spring type having a wide latitude of winding tolerance for the spring elements.

Another object of the invention is to provide a coupling member having inherent torsional damping features.

Another object of the invention is to provide a constant velocity coupling member and a flexible coupling which is economical to manufacture.

These and other objects and advantages will become more apparent upon review of the drawings and descriptions thereof, wherein.

DESCRIPTION OF PREFERRED EMBODIMENT

Figure 1:
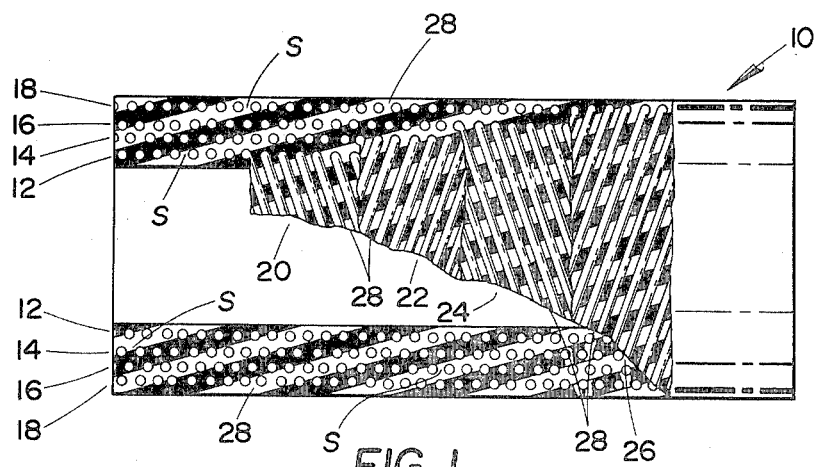
FIG. 1 is a cutaway side view of a coupling member of the invention.

The invention is directed toward using a resiliently supported spring means as the yielding element in a flexible coupling member for transmitting large torques between driver and driven members. Referring to FIG. 1, the coupling member 10 is generally of tubular shape although other shapes, such as frustoconical, could be used. The tubular shape is preferred for manufacturing reasons which will be later explained. The primary load carrying member for the yieldable coupling member is a spring means comprising circumjacent spring elements 12, 14, 16, 18. Each spring element 12, 14, 16, 18 comprises a plurality of spiraled wires. Successive concentric sleeves of spring elements 12, 14, 16, 18 are wound at opposite spirals but at similar helical angles. Preferably under large-torque applications, four spring elements are used although a minimum of two spring elements may be employed for nonreversing torque applications. Wires 20, 22, 24, 26 of each spring element 12, 14, 16, 18 are spiraled at a helical angle between the range of 51° and 84°. It is readily understood that more than one layer of wires may be used to define a spring element. For a given size coupling member, greater helix angles decrease wire bending stresses by increasing the number of spirals a wire makes between ends of the coupling member. However, larger helical angles lead to higher operating temperatures and fatigue stress. Preferably, the helix angle is about 70° "Spring index" is defined as the ratio of the mean diameter of a spring element 12, 14, 16, 18 to the wire 20, 22, 24, 26 diameter. Higher spring indexes yield a coupling member 10 which is relatively weak in torsion. As spring index becomes smaller, the columnar strength of the wires 20, 22, 24, 26 increases. Coupling members having an average spring index between 26 and 79 have proven satisfactory, but a spring index of 32.1 is preferred for large torque applications (2,400 foot-pounds). The spring elements 12, 14, 16, 18 are nested in a rubber matrix 28 which lends support to the spring elements 12, 14, 16, 18 while limiting radial contact therebetween. It should be noted that there is a definite spacing S between the wires 20, 22, 24, 26 of each spring element which is occupied by the resilient rubber matrix 28. The spacing S permits relative movement between the wires as the coupling member is flexed. Flexing the coupling member 10 causes the spacing between the wires to increase or decrease which respectively distends or compresses the rubber matrix 28. Consistent spacing between each wire is not critical although average spacing of the wire is important. Wire spacing S may be expressed as a percentage of fill where 100 percent represents no spacing between wires, or 100 percent wire. High fill values yield relatively high torsional strength for the coupling member whereas low fill values yield more flexibility. A fill value of 55 percent is preferred although fill values between 43 percent and 80 percent have proven satisfactory.

There is a preferred direction of rotation when a four spring element coupling member is used to transmit torque. The first or innermost spring element 12 moves radially outward when a torque is applied in a direction T that "unwinds" the spring element. Conversely, the second or circumjacent spring element 14 moves radially inward when a torque of the same direction T is applied. Similarly, the third spring element 16 moves radially outward while the fourth or outermost spring element 18 moves radially inward. The rubber matrix 28 between the first 12 and second 14, and third 16 and fourth 18 spring elements, is compressed. The rubber matrix 28 resiliently resists compression and reacts against the wires 20, 22, 24, 26 of each spring element 12, 14, 16, 18 and lends support thereto. The first 12 and second 14 spring elements pair up and coact with the rubber matrix 28 to define a locked structure capable of transmitting torque. In the locked condition, wires 20 of the first spring element 12 are structurally loaded as a column and go into compression whereas wires 22 of the second spring element 14 go into tension. Wires 24 of the third spring element 16 are similarly loaded in compression and wires 26 of the fourth spring element 18 are loaded in tension. Wire contact between paired spring elements is kept to a minimum by the rubber matrix. Minimum contact between circumjacent spring elements 12, 14 and 16, 18 limits wire frettage and alleviates the need for a lubricant.

When the direction of torque application is reversed, the spring elements 12, 14, 16, 18 move in radially opposite directions. Consequently, the second 14 and third 16 elements move together to form a locked pair. The first 12 and fourth 18 spring elements have no corresponding elements with which to pair. Accordingly, the four spring element coupling member has less torque-carrying ability in reverse. It is readily understood that if only one direction of torque application is desired, a two spring element coupling member should suffice. Similarly, only a three spring element coupling member is necessary to provide torque carrying capability in forward and reverse directions.

When the coupling member 10 is under torsional stresses, the rubber matrix 28 is of prime importance because of the resilient support it gives to wires under compression stresses. The matrix 28 nests or encompasses each wire and improves the column or buckling strength thereof. It is theorized that structural support is transferred from wires being tensioned, through the matrix 28, and to the wires under compression. Good adhesion between the wires 20, 22, 24, 26 and the rubber matrix 28 is necessary for satisfactory torque transmission. It has been demonstrated that a coupling member having a good adhesive bond between the wires and the matrix will satisfactorily transmit 2,000 foot-pounds whereas a similar coupling member having little or no adhesion will transmit only 200 foot-pounds before failure by buckling occurs.

The support capability of the rubber matrix permits use of large random tolerances in wire spacing S and wire helix angles without seriously affecting the torque-carrying capability of the coupling member. This feature allows use of improved manufacturing techniques. In prior art manufacturing of spring type coupling members, it is necessary to precoil the spring elements. Precoiling demands use of a good grade wire to insure uniformity of the spring elements. After precoiling, prior art couplings are individually assembled.

The coupling member of the invention does not require precoiling of the spring elements and individual assembly thereof. The coupling member 10 is fabricated on a mandrel. First, a layer of uncured rubber material is wrapped on the mandrel. Wires are then spiraled over the uncured material at the desired helix angle which forms a first spring element. Alternate layers of rubber material and wire are laminated over the fabrication until at least two or more circumjacent spring elements having opposite helix angles are defined. As large random tolerances are acceptable for both spacing and helix angle, wires of lower quality may be used. The laminated assembly is then cured at the proper temperature and pressure dictated by the rubber compound to define an assembly from which coupling members may be cut and assembled into flexible couplings.

Figure 2:
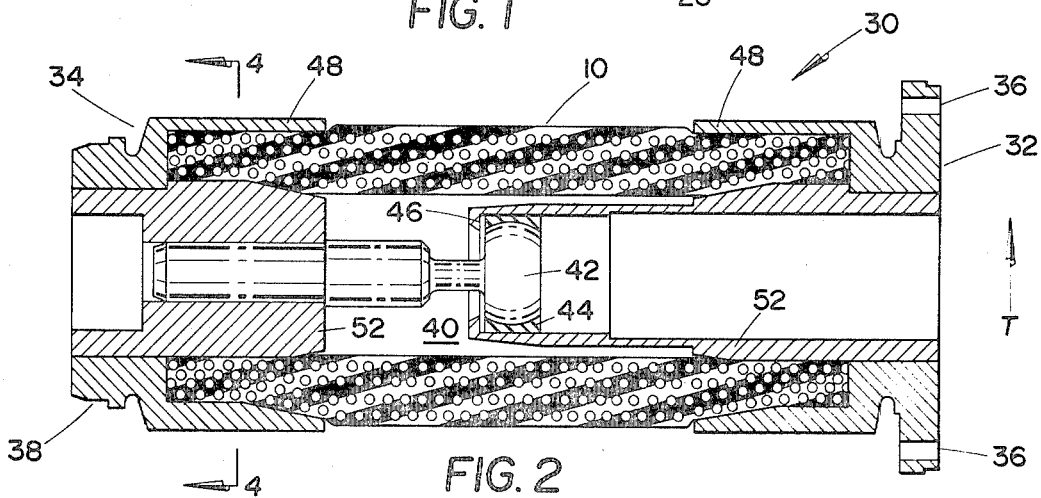
FIG. 2 is an axial, cross-sectional view of a flexible coupling of the invention.

Referring now to FIG. 2, a flexible coupling 30 which includes the coupling member 10 of the invention is shown. End caps 32, 34 are affixed to the coupling member in a manner which will be later explained. The end caps may have any desired interface for attaching to driver and driven shafts. For example, one end cap 32 may have a bolt circle 36 for interfacing and attaching to a driver shaft and the other end cap 34 may have an adapter 38 for welding attachment to a driven shaft. A centering device 40 is attached to and extends from each end cap 32, 34. The centering device 40 permits only angular misalignment of the end caps 32, 34 which greatly improves the buckling strength or torque-carrying capability of the coupling member 10. The centering device 40 includes a ball 42 which extends from and is attached to one end cap 34, and a socket 44 that receives the ball 42. When the end caps 32, 34 are positioned in angular misalignment the ball 42 rotates in the socket 44. The socket 44 is slideably mounted with respect to its supporting end cap 32 to accommodate length variations which occur in the coupling member 10 as it is torqued. Shoulder 46 reacts against the socket 44 and precludes overextension of the coupling member 10.

Figure 3:
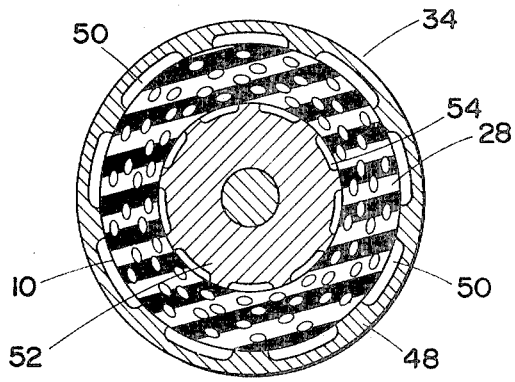
FIG. 3 is a transverse sectional view showing the flexible coupling of FIG. 2 during a stage of manufacture.
Figure 4:
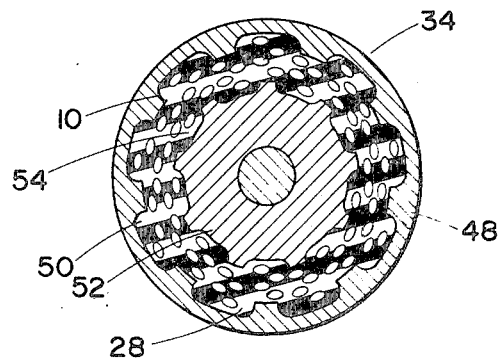
FIG. 4 is a view similar to that of FIG. 3 but taken along the line 4—4 of FIG. 2 and showing the flexible coupling in a final stage of manufacture.

The end caps may be attached to the coupling member by crimping. The ability of the coupling member 10 to receive and transmit large torques is primarily due to the rubber matrix 28. There is minimum physical contact between the wires of the coupling member 10 and the end caps 32, 34. Torsional loads are transferred from the end caps 32, 34 through the rubber matrix 28, and to the spring elements 12, 14, 16, 18. Referring now to FIGS. 2, 3, and 4, the method of crimping the end caps 32, 34 to the coupling member 10 is shown. As shown in FIG. 3, an end cap 34 is fitted on a coupling member 10. The outer sleeve 48 of the end cap 34 has a plurality of axial concavities or serrations 50. The inner hub 52 of the end cap 34 has a plurality of corresponding serrations 54 which are offset from the serrations 50 of the sleeve 48. Referring now to FIG. 4, a radially inward force is applied to deform the sleeve 48 which, in turn, deforms the coupling member 10. The rubber matrix 28 and a few random wires are displaced into the concavities or serrations 50, 54.

ADDITIONAL SPECIES

Figure 5:
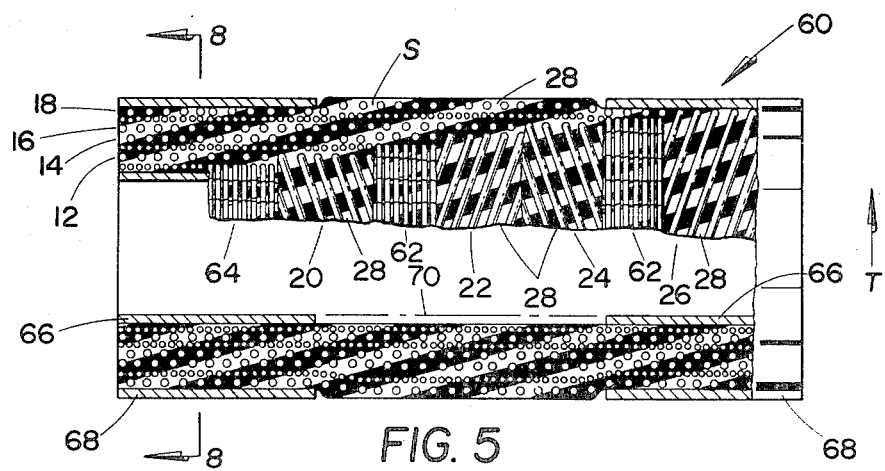
FIG. 5 is a cutaway side view showing an alternate form of a coupling member of the invention.

Referring to FIG. 5, an alternate form 60 of the coupling member 10 of FIG. 1 is shown. The coupling member 60 has the same basic construction and functions in a manner similar to that for coupling member 10. Coupling member 60 further includes: (1) layers of textile material 62, 64 disposed within the rubber matrix 28; and (2) concentric sleeves 66, 68 sandwiching the coupling member at each end thereof.

As previously explained, there is a preferred direction of rotation for a coupling member 60 having four spring elements 12, 14, 16, 18. When torque T is applied to the coupling member 60, spring elements 12 and 14 move toward each other to form a locked pair as do spring elements 16 and 18. Preferably, textile material 62 is disposed between only those spring elements which pair together in the preferred direction of torque application T. The textile material 62 is disposed between the spring elements as a further deterant to keep physical contact between circumjacent spring elements to a minimum. The textile material 62 may be spiraled or circumferentially arranged within the coupling member. Additional layers of textile material may be included but additional layers increase the flexural rigidity of the coupling member. Optionally, a layer of textile material 64 is used in the fabrication process to facilitate spiraling of the first spring element 12 by providing a firm foundation upon which to wind the wires 20.

Figures 6, 7, 8:
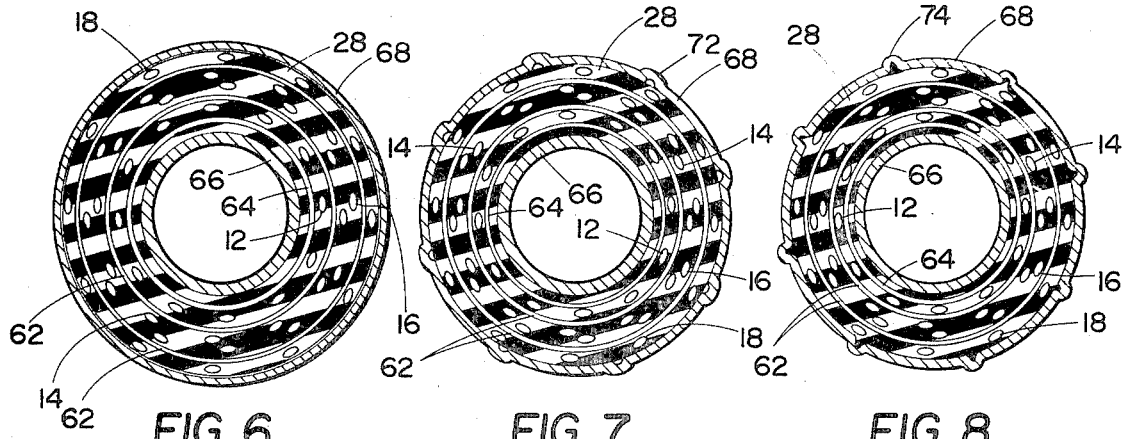
FIG. 6 is a transverse sectional view showing the coupling member of FIG. 5 during a stage of manufacture.
FIG. 7 is a transverse sectional view similar to that of FIG. 6 but showing the flexible coupling in a different stage of manufacture.
FIG. 8 is a view similar to that of FIGS. 6 and 7 but taken along the line 8—8 of FIG. 5 and showing the flexible coupling in a final stage of manufacture.

The concentric sleeves 66, 68 are built into the coupling member during the fabrication process. The sleeves 66, 68 facilitate attaching end caps to the coupling member which is later explained. During fabrication of the coupling member 60, the inner sleeves 66 are positioned on a mandrel, not shown, and held in a spaced-apart relationship by means of a disposable sleeve 70 as shown in phantom. Layers of rubber matrix 28, textile material impregnated with rubber and spring elements 12, 14, 16, 18 are laminated over the sleeves 66, 70 in a manner as that previously explained. Fabrication of the coupling member is continued by positioning a sleeve 68 around the laminated assembly as shown in FIG. 6. Next, the outer sleeve 68 is precrimped 72 to forcibly reduce the annular space between the sleeves and provide firm and contiguous contact between the outer sleeve 68 and the uncured rubber matrix as is shown in FIG. 7. The precrimping assures a continuous adhesive bond between the outer sleeve 68 and the rubber matrix 28 during curing of the matrix. The cured assembly is then cut into desired lengths. Preferably, sleeve members 66, 68 are of double length during the fabrication process and are cut in half when the assembly is cut into desired lengths. After cutting and curing, the sleeve 68 is postcrimped 74 to further reduce the annular area between sleeves 66, 68 and put the rubber matrix 28 into compression as is shown in FIG. 8. The rubber matrix 28 is compressed to increase the torque-carrying capability of the coupling member.

Figure 9:
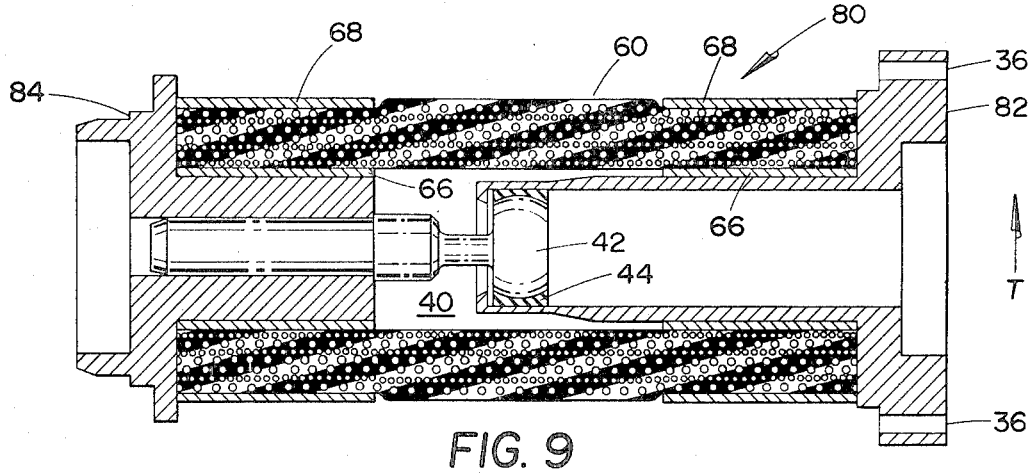
FIG. 9 is an axial, cross-sectional view showing an alternate form of a flexible coupling of the invention.

Referring to FIG. 9, a flexible coupling 80 which includes the coupling member 60 of the invention is shown. End caps 82, 84 are affixed to the sleeves 66, 68 of the coupling member 60 by welding or otherwise. Here again, the end caps 82, 84 may be of any desired configuration for attaching to driver and driven shafts. The operation of the coupling member is the same as previously explained for the flexible coupling 30 of FIG. 2.

The foregoing detailed description was made for purpose of illustration only and is not intended to limit the scope of the invention which is to be determined from the appended claims.

What is claimed is:

1. A coupling member for transmitting torque between driver and driven shafts, comprising:
    a plurality of closely spaced concentric spring elements each composed of a plurality of spirally wound and spaced-apart wires, the wires of circumjacent spring elements forming opposite helices; and
    a rubber matrix of essentially annular cross section substantially encompassing the wires and substantially disposed between said spring elements, said rubber matrix adhered to and lending support to the wires of each spring element;
    whereby application of torque to the coupling member in a predetermined direction moves two circumjacent spring elements radially toward each other stressing the rubber matrix therebetween to define a locked structure.

2. A coupling member for transmitting torque between driver and driven shafts, comprising:
    a plurality of concentric spring elements, each composed of spirally wound and spaced-apart wires, the wires of circumjacent spring elements forming opposite helices;
    a rubber matrix of essentially annular cross section substantially encompassing said spring elements, said rubber matrix adhered to and lending support to the wires of each spring element; and
    a rubber-impregnated textile material disposed between at least one pair of circumjacent spring elements, whereby said textile material prevents substantial physical contact between the sandwiching pair of circumjacent spring elements.

3. A coupling member as set forth in claim 1 which further comprises concentric inner and outer sleeves disposed at each end of the spring elements, said inner and outer sleeves sandwiching and adhered to said rubber matrix.

4. A coupling member as set forth in claim 1 wherein the wires of said spring elements are for transmitting torque between driver and driven shafts, comprising:
    a plurality of concentric spring elements, each composed of spirally wound and spaced-apart wires, the wires of circumjacent spring elements forming opposite helices and spiraled at a helical angle between the range of 51° and 84°; and
    a rubber matrix of essentially annular cross section substantially encompassing said spring elements, said rubber matrix adhered to and lending support to the wires of each spring element.

5. A coupling member as set forth in claim 1 for transmitting torque between driver and driven shafts, comprising:
    a plurality of concentric spring elements, each composed of spirally wound and spaced-apart wires, wherein the percentage of fill of the spaced-apart wires of a spring element is between the range of 43 and 80 percent, the wires of circumjacent spring elements forming opposite helices; and
    a rubber matrix of essentially annular cross section substantially encompassing said spring elements, said rubber matrix adhered to and lending support to the wires of each spring element.

6. A coupling member as set forth in claim 1 for transmitting torque between driver and driven shafts, comprising:
    a plurality of concentric spring elements, each composed of spirally wound and spaced-apart wires wherein the spring index for the wires of a spring element is between the range of 26 and 79, and the wires of circumjacent spring elements forming opposite helices; and
    a rubber matrix of essentially annular cross section substantially encompassing said spring elements, said rubber matrix adhered to and lending support to the wires of each spring element.

7. A flexible coupling for transmitting torque between driver and driven shafts, comprising:
    a plurality of closely spaced concentric spring elements of substantially cylindrical shape, each composed of a plurality of spirally wound and spaced-apart wires, the wires of circumjacent spring elements forming opposite helices;
    a rubber matrix of essentially annular cross section encompassing the wires and substantially disposed between said spring elements, said rubber matrix adhered to and lending support to the wires of each spring element;
    whereby application of torque to the coupling in a predetermined direction moves two circumjacent spring elements radially toward each other stressing the rubber matrix therebetween to define a locked structure; and an end cap disposed at each end of the concentric spring elements, said end cap including an inner hub having a plurality of axial serrations, and a concentric outer sleeve having a plurality of axial serrations offset from the axial serrations of said hub, said hub and said sleeve sandwiching a portion of said rubber matrix and said spring elements.

8. A flexible coupling for transmitting torque between driver and driven shafts, comprising:

a plurality of concentric spring elements, each composed of spirally wound and spaced-apart wires, the wires of circumjacent spring elements forming opposite helices;

a rubber matrix of essentially annular cross section encompassing said spring elements, said rubber matrix adhered to and lending support to the wires of each spring element;

an end cap disposed at each end of the concentric spring elements, said end cap including an inner hub having a plurality of axial serrations, and a concentric outer sleeve having a plurality of axial serrations offset from the axial serrations of said hub, said hub and said sleeve sandwiching a portion of said rubber matrix and said spring elements; and a centering means for limiting movement between said end caps to angular misalignment.

9. An end cap for transmitting torque to and from a coupling member of the type having a plurality of concentric spring elements disposed within a rubber matrix, which comprises:

an inner hub having a plurality of axial serrations; and a concentric outer sleeve having a plurality of axial serrations offset from the axial serrations of said hub, said hub and said sleeve defining an annular area for sandwiching the ends of a coupling member.

10. A flexible coupling for transmitting torque between driver and driven shafts, comprising:

a plurality of closely spaced concentric spring elements of substantially cylindrical shape, each composed of a plurality of spirally wound and spaced-apart wires, the wires of circumjacent spring elements forming opposite helices;

a rubber matrix of essentially annular cross section substantially encompassing the wires and substantially disposed between said spring elements, said rubber matrix adhered to and lending support to the wires of each spring element;

whereby application of torque to the coupling in a predetermined direction moves two circumjacent spring elements radially toward each other stressing the rubber matrix therebetween to define a locked structure;

concentric inner and outer sleeves disposed at each end of the spring elements, said inner and outer sleeves sandwiching and adhered to said rubber matrix; and an end cap attached to said inner and outer sleeves for attaching to the driver and driven shafts.

11. A flexible coupling for transmitting torque between driver and driven shafts, comprising:

a plurality of concentric spring elements, each composed of spirally wound and spaced-apart wires, the wires of circumjacent spring elements forming opposite helices;

a rubber matrix of essentially annular cross section substantially encompassing said spring elements, said rubber matrix adhered to and lending support to the wires of each spring element;

concentric inner and outer sleeves disposed at each end of the spring elements, said inner and outer sleeves sandwiching and adhered to said rubber matrix;

an end cap attached to said inner and outer sleeves for attaching to the driver and driven shafts; and a centering means for limiting movement between said end caps to angular misalignment.

12. A method of attaching inner and outer concentric sleeves to each end of a coupling member of the type in which a rubber matrix imparts torsional loads to concentric spring elements disposed within the rubber matrix, including:

sandwiching uncured rubber matrix between the inner and outer spring elements;

forcibly reducing the annular space between the inner and outer sleeve elements to provide firm and contiguous contact between the inner and outer sleeves, and the rubber matrix;

curing the rubber matrix to the sleeves; and further reducing the annular space between the sleeves to place the rubber matrix in compression.

* * * * *